United States Patent [19]
Pfennig

[11] Patent Number: 5,101,683
[45] Date of Patent: Apr. 7, 1992

[54] CRANKSHAFT WITH CONNECTING ROD SUPPORT

[75] Inventor: Franz Pfennig, Niederwerrn, Fed. Rep. of Germany

[73] Assignee: FAG Kugelfischer Georg Schafer, Fed. Rep. of Germany

[21] Appl. No.: 654,749

[22] Filed: Feb. 13, 1991

[30] Foreign Application Priority Data

Feb. 26, 1990 [DE] Fed. Rep. of Germany ....... 4006016

[51] Int. Cl.$^5$ ............................................... B21K 1/08
[52] U.S. Cl. ........................................ 74/595; 74/598; 384/512; 384/569
[58] Field of Search .................. 74/595, 596, 597, 598; 384/512, 569

[56] References Cited

U.S. PATENT DOCUMENTS

| | | |
|---|---|---|
| 1,613,835 | 1/1927 | Kasper ................................. 74/596 |
| 3,071,024 | 1/1963 | Nipken ................................. 74/598 |
| 3,147,638 | 9/1964 | Rice ..................................... 74/598 |
| 3,851,361 | 12/1974 | Bowen, III ......................... 74/598 X |

FOREIGN PATENT DOCUMENTS 630415 5/1936 Fed. Rep. of Germany ........ 74/598

Primary Examiner—Leslie A. Braun
Assistant Examiner—William O. Trousdell
Attorney, Agent, or Firm—Ostrolenk, Faber, Gerb & Soffen

[57] ABSTRACT

A crankshaft including an eccentric cranked section which is divided into two parts. A unitary inner ring is force fit over the outer surfaces of both parts of the cranked section of the crankshaft. At each axial end of the inner ring, a groove is opposite a hole in the shaft. A connecting pin extends between them. This prevents rotation of the inner ring around the cranked section of the shaft. For strengthening the cranked section, there is a continuous bore hole through both of its parts and a connecting screw extending through the bore hole. A support for the connecting rod engages the crankshaft cranked section at the bearing inner ring.

12 Claims, 1 Drawing Sheet

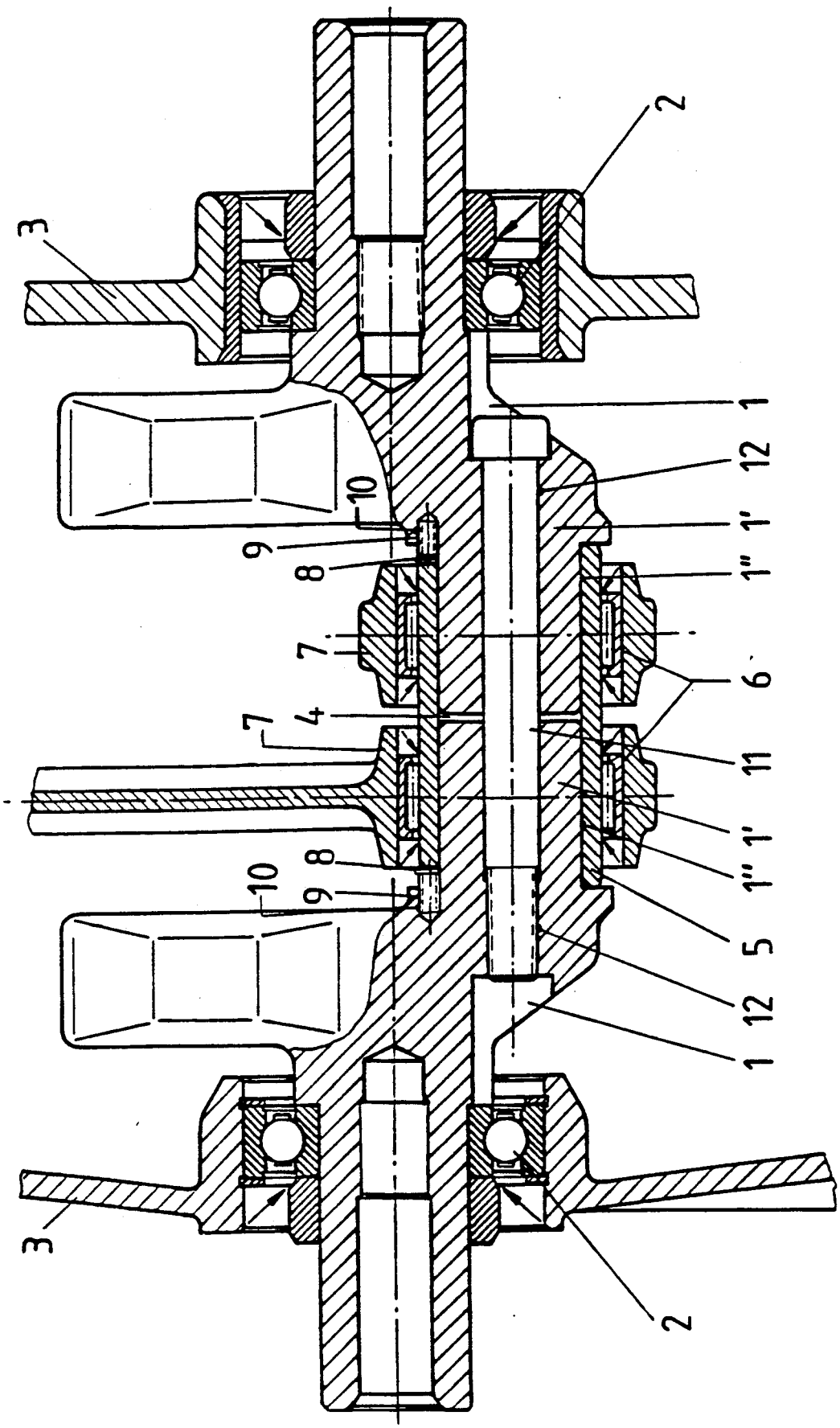

CRANKSHAFT WITH CONNECTING ROD SUPPORT

BACKGROUND OF THE INVENTION

The present invention relates to a crankshaft with a connecting rod support comprising at least one anti-friction bearing.

An embodiment of such a crankshaft is shown and described in a publication of FAG, the assignee hereof, "Walzlagertechnik 1986", page 27. In that embodiment, the crankshaft is in a single piece. It is therefore difficult to mount the bearings and the connecting rod to the crankshaft. Split bearing parts and a split connecting rod foot on each bearing are therefore necessary. However, they require increased expense of manufacture. Since larger cross sections and connecting means are required at the places of the splits, this embodiment is also not optimum from the standpoint of weight.

SUMMARY OF THE INVENTION

The object of the present invention is to improve a crankshaft with a connecting rod support to avoid the above-mentioned disadvantages and to provide a unit which is simple to manufacture and of light weight.

The crankshaft of the invention may be used in any installation where crankshafts are needed and where the crankshaft is associated with a connecting rod support and wherein there is a bearing between the cranked section, which is an off axis or eccentric section, of the crankshaft and the connecting rod support. The crankshaft has opposite end regions which may be supported in stationary bearings. The end regions are generally on a common axis. At a location between the end regions, the crankshaft has a cranked section, that is a section which is eccentric or off the main axis of the crankshaft, and is generally on an eccentric axis usually parallel to the main axis.

According to the invention, instead of the cranked section being of one piece, it is divided into two parts, that is, it is completely broken through.

The connecting rod support is supported to the cranked section by a bearing. The bearing has an inner ring. That inner ring is preferably force fitted over the outer surfaces of the cranked section of the crankshaft. The inner ring is of an axial length and size and is so placed as to extend over at least part of both of the divided parts of the cranked section of the crankshaft and over the division or split area between the parts of the cranked section. There is at least one bearing around the inner ring, and preferably, there is at least one respective bearing on the single inner ring and over each of the two parts of the crankshaft.

It is preferable that the bearing inner ring not rotate with respect to the cranked section, as the cranked section rotates with the crankshaft. For this purpose, the inner ring is not only force fit on the outer surface of the crankshaft but there are connecting elements between the inner ring and the crankshaft that prohibits their relative rotation. For example, there is a connecting element receiving means on at least one axial end of the inner ring, a cooperating connecting element receiving means on the shaft, and a connecting element extending between them. The connecting element receiving means on the inner ring may be a groove in it, that receiving means on the shaft may be a hole bored in the shaft and generally aligned with the groove and the connecting element between the two receiving means may be a pin extending between them. Preferably, there is such an arrangement on both axial ends of the inner ring.

The eccentric, cranked section of the crankshaft may have an additional connecting element extending through it between the divided parts of the cranked section. For example, there may be a continuous aligned bore hole between the two divided parts of the cranked section, and the additional connecting element, e.g. in the form of a connecting screw, extends between those two divided parts.

Outward of the inner ring, the bearing has bearing roller elements and has an outer ring outward of the roller elements. For example, needle bearings may be provided.

Because the crankshaft is split or divided at its cranked region, which is axially where the connecting rod support is arranged, manufacture of the crankshaft becomes simpler than with prior art crankshafts. Since the anti-friction bearings and the connecting rod foot can also be pushed on in this split region, simpler assembly is possible than previously. Split anti-friction bearings and split connecting rods, which have known disadvantages, are not required. The crankshaft parts are connected because the inner bearing ring of the connecting rod support is of one piece and because that ring extends over a sufficient portion of the outer surface of the cranked section of the crankshaft in the divided region and thus holds both split parts sufficiently together, particularly if a pressure connection is used. Then one or more bearings, preferably needle bearings, can be arranged on the single part inner ring. The connecting rod foot also need no longer be split. This embodiment produces a more stable development of the connecting rod with a resultant saving of weight, since elimination of the split in the bearings and in the connecting rod foot permits thinner cross sections at the foot of the connecting rod. It is further of particular advantage that in the event of damage to the bearing as a result of wear, the expensive crankshaft need no longer be scrapped, but only the inner ring need be replaced. The inner ring furthermore has two functions. It forms a rolling surface for the bearing needles and at the same time it acts as a connecting element between the divided parts.

In order for the inner ring to remain definitely fixed for rotation on the cranked sections of the shaft, it is advisable, in accordance with one embodiment of the invention, to provide connecting element receiving means in the form of bored holes or the like in the inner ring, at least at one axial side, in which there is arranged a connecting element in the form of a pin which extends axially into a second connecting element receiving means in the form of a groove in the shaft. However, providing the connecting element or pin on the two axial sides of the inner ring is preferred since in that case, highly desirable exact alignment of the crankshaft parts is obtained upon the assembly of the crankshaft, as is necessary for uniform loading of the crankshaft bearings.

In certain uses, it may further be necessary to strengthen the connection through the one piece inner ring by providing the shaft in the split section of the crank with a fastening screw which is arranged in a bored hole which passes through both divided parts of the cranked section.

BRIEF DESCRIPTION OF THE DRAWING

Other objects and features of the invention are described with reference to the drawing, which shows a cross section through a crankshaft with a connecting rod support.

DESCRIPTION OF A PREFERRED EMBODIMENT

In the Figure, the crankshaft 1 is fastened at both axial end regions via bearings 2 within the housing 3. The crankshaft 1 is split into two parts at a parting place 4 located in the region of the radially offset eccentric or cranked section 1' of the shaft. These two parts are connected by the single part inner ring 5 which is held with a force fit around the outer surfaces 1'' of the crankshaft section 1'. The inner ring 5 defines the inner raceways for two axially separated anti-friction bearings 6, here shown in the form of needle bearings. The unsplit connecting rod feet 7 rest on the two bearings 6 and define the outer raceways thereof.

In order to precisely align the two parts of the crankshaft 1, the inner ring 5 is provided at both axial ends with a narrow groove 8 within which an axial pin 9 is arranged. The pins 9 are also seated in axially bored holes 10 in the shaft 1 and extend in each case without play into the inner ring.

To improve the connection between the divided parts and to strengthen the cranked section, a fastening screw 11 is furthermore provided in the cranked section 1' of the crankshaft 1. The screw extends through a bore hole 12 which extends through both parts of the cranked section 1. The head of the screw is at one divided part and the threads of the screw engage in the bore hole in the other divided part.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A crankshaft with a connecting rod support, wherein the crankshaft comprises:

opposite axially spaced apart end regions on a main axis, a cranked eccentric section of the shaft between and joining the end regions of the shaft; the cranked section of the shaft being divided across the cranked section into separate divided parts, the cranked section at both separated parts having an outer surface;

an anti-friction bearing disposed around the cranked section of the shaft, the anti-friction bearing including an inner ring seated on and extending over the outer surfaces of both of the crankshaft parts at the cranked section; wherein the inner ring acts as a connecting means for the divided parts of the cranked section; the crankshaft further including other bearing elements extending around the inner ring and being connectable with a connecting rod for connection between the crankshaft and the connecting rod.

2. The crankshaft of claim 1, comprising a respective anti-friction bearing on each of the divided parts of the cranked section of the crankshaft, and the inner ring around the outer surfaces of the cranked section defining the inner ring of each of the respective bearings on the cranked section parts.

3. The crankshaft of claim 1, further comprising means for preventing the inner ring from rotating around the cranked section.

4. The crankshaft of claim 3, further comprising a second connecting means extending through the cranked section between the divided parts.

5. The crankshaft of claim 1, wherein the outer surfaces of the cranked section parts and the inner ring are respectively so shaped that the inner ring is force fit on the outer surfaces of the cranked section.

6. The crankshaft of claim 5, wherein the inner ring has opposite axial ends, at at least one axial end thereof, the inner ring has a first connecting element receiving means in it, the cranked section of the crankshaft has a second connecting element receiving means in it;

wherein a connecting element extends between the first and second receiving means for holding the inner ring to the cranked section for preventing rotation of the inner ring with respect to the cranked section of the shaft.

7. The crankshaft of claim 6, wherein the first connecting element receiving means comprises a groove at the respective axial end of the inner ring, the second connecting element receiving means on the shaft comprises a hole in the shaft, and the connecting element comprises a pin; the groove at the respective axial end of the inner ring and the hole in the shaft are aligned such that the pin extends between them for preventing rotation of the inner ring with respect to the cranked section of the shaft.

8. The crankshaft of claim 7, wherein there is a respective connecting element groove on each axial end of the inner ring, a respective cooperating hole in the shaft and a respective pin between each groove and the respective hole.

9. The crankshaft of claim 7, further comprising a bore hole extending axially through the cranked section and between the divided parts of the cranked section; and a removable second connecting means extending through the bore hole and between the divided parts of the cranked section.

10. The crankshaft of claim 5, further comprising a bore hole extending axially through the cranked section and between the divided parts of the cranked section; and a removable second connecting means extending through the bore hole and between the divided parts of the cranked section.

11. The crankshaft of claim 3, further comprising a bore hole extending axially through the cranked section and across the division between the parts of the cranked section; and a removable second connecting means extending through the bore hole and between the divided parts of the cranked section.

12. The crankshaft of claim 11, wherein the second connecting means comprises a threaded connecting screw, and at least one part of the cranked section being shaped for receiving the threads of the screw.

* * * * *